United States Patent [19]
Hayashi et al.

[11] Patent Number: 5,262,629
[45] Date of Patent: Nov. 16, 1993

[54] INFORMATION RECORDING AND REPRODUCING APPARATUS

[75] Inventors: Hiroshi Hayashi, Sakado; Hidenori Suzuki, Fujimi, both of Japan

[73] Assignee: Nippon Conlux Co., Ltd., Tokyo, Japan

[21] Appl. No.: 849,945

[22] Filed: Mar. 12, 1992

[30] Foreign Application Priority Data

Apr. 10, 1991 [JP] Japan .................. 3-104768

[51] Int. Cl.$^5$ .................................. G06K 7/00
[52] U.S. Cl. .................................. 235/486; 235/454; 235/479
[58] Field of Search ............... 235/454, 485, 486, 477, 235/479, 483, 475

[56] References Cited

U.S. PATENT DOCUMENTS

| | | | |
|---|---|---|---|
| 4,501,959 | 2/1985 | Stockburger et al. | 235/485 |
| 4,933,537 | 6/1990 | Takahashi et al. | 235/475 |
| 5,017,764 | 5/1991 | Hashimoto et al. | 235/454 |
| 5,099,111 | 3/1992 | Takakura et al. | 235/475 |
| 5,136,144 | 8/1992 | Swinton et al. | 235/475 |
| 5,149,951 | 9/1992 | Vogelgesang | 235/454 |
| 5,179,268 | 1/1993 | Nitto et al. | 235/454 |

FOREIGN PATENT DOCUMENTS

| | | | |
|---|---|---|---|
| 0386705 | 9/1990 | European Pat. Off. | 235/475 |
| 0485201 | 5/1992 | European Pat. Off. | 235/475 |
| 0163988 | 7/1988 | Japan | 235/475 |

*Primary Examiner*—Willis R. Wolfe
*Assistant Examiner*—Erick Solis
*Attorney, Agent, or Firm*—Spensley Horn Jubas & Lubitz

[57] ABSTRACT

An information recording and reproducing apparatus includes a card carriage. The card carriage is provided in the opposite sides thereof with card holding plates, respectively. The card holding plates have each a groove into which a corresponding lateral edge of an optical card is inserted. At least one of the card holding plates is supported in a cantilever fashion on a card carriage through a flexible portion thereof. The upper surface of the card carriage has an upper ridge formed at a portion close to one lateral edge of the optical card. The upper surface of the card carriage oppositely faces the rear face of the optical card. The inner edge portion of the one card holding plate is provided at a position away from the outer ridge at a predetermined distance with an inner ridge.

8 Claims, 3 Drawing Sheets

INFORMATION RECORDING AND REPRODUCING APPARATUS

BACKGROUND OF THE INVENTION

The present invention relates to an information recording and reproducing apparatus, and particularly relates to a card holding unit of the information recording and reproducing apparatus for holding an information card on a card carriage.

In information recording and reproducing apparatuses using an information card, such as an optical card, the information card is held on a card carriage, which makes linear reciprocal relative movement in a direction perpendicular to the optical head, so that data tracks on the information card are scanned for recording and reproducing the information. (see Japanese patent unexamined laid-open or kokai publication No. 64 (1989)-1183, for example)

To correctly record information in and reproduce information from an information card in such a kind of information recording and reproducing apparatus, it is necessary to focus accurately a beam of light irradiated from the optical head to an information area of the information card. For this purpose the position of the focusing lens is usually controlled by focusing servo.

There is however a controllable range in the control of the control means such as the focusing servo, and hence the distance between the optical head and the information card must be kept substantially constant so that the dispersion in the distance in the whole information areas is included within the controllable range of the control means.

As shown in FIG. 7, to hold an information card 50 on a card carriage 51 according to the prior art, card holding plates 53a and 53b are supported on respective lateral edges of the card carriage 51 in a cantilever fashion, and guiding and holding grooves 52a and 52b are formed between the card holding plates 53a and 53b and the upper surface 51a of the card carriage 51, respectively. The information card 50 inserted into the grooves 52a and 52b is depressed and held at the upper surface 50a thereof by projections 54a and 54b of the card holding plates 53a and 53b.

In this information recording and reproducing apparatus, it is, however, impossible to keep the distance between the upper surface 50a of the information card 50 and the optical head at a predetermined value when as shown in FIG. 7, the information card 50 is considerably bent upwardly. In this case, information cannot be correctly recorded in or reproduced from the information card 50.

SUMMARY OF THE INVENTION

Accordingly, it is an object of the present invention to provide an information recording and reproducing apparatus which is capable of overcoming the problem previously described.

In view of this and other objects, the present invention provides an information recording and reproducing apparatus of the type which includes a card carrier having an upper surface and opposite lateral edges and adapted for linear reciprocal movement between a front stop position and a rear stop position, a card holder provided to the card carrier for holding an information card on the card carrier, and an optical head reciprocally movable in a direction perpendicular to the movement of the card carrier for recording information in and reproducing information from the information card held on the card carriage, wherein: the card holder comprises first and second card holding means, arranged in respective lateral edges of the card carrier for holding the information card, the first and second card holding means defining respective grooves in cooperation with the upper surface of the card carrier and each including contact means for contacting the information card inserted into the grooves, one of the first and second card holding means including resiliently depressing means for resiliently depressing the contact means thereof against the information card inserted into the grooves; and the card carriage includes raising means, arranged on the upper surface thereof, for raising the information card, the raising means being located away from the contact means of the first and second card holding means so that the information card placed on the card carrier becomes substantially flat in cooperation with the contact means of the first and second card holding means and the raising means for keeping the distance between the information card and the optical head substantially constant.

When an upwardly convexly bent information card is inserted into the grooves of the first and second card holding means, the information card becomes substantially flat in cooperation with the contact means of the first and second card holding means and the raising means for keeping the distance between the information card and the optical head substantially constant.

DETAILED DESCRIPTION OF THE PREFERRED EMBODIMENTS

Figure 1:
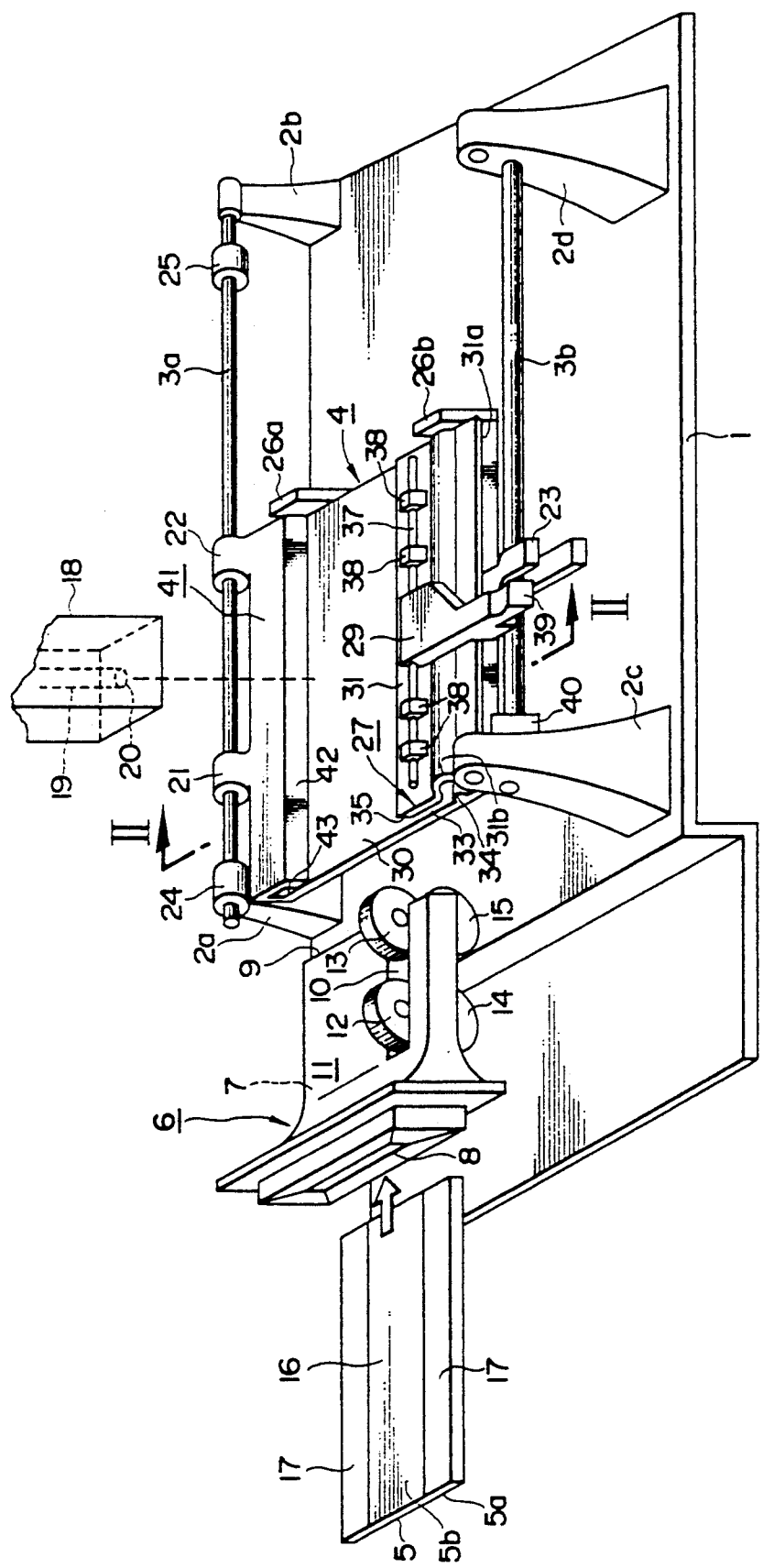
FIG. 1 is a perspective view of an information recording and reproducing apparatus according to the present invention.

Referring to FIGS. 1 to 6, an information recording and reproducing apparatus according to the present invention will be described. In FIG. 1, the reference numeral 1 designates a base, on the four corners of which there are erected two pairs of brackets 2a and 2b; 2c and 2d. A pair of guide shafts 3a and 3b horizontally span between respective pairs of brackets 2a and 2b; 2c and 2d in a parallel manner. A card carrier 4 is slidably mounted on the guide shafts 3a and 3b, and is linearly reciprocally moved between a forward stop position and a rear stop position by a linear motor M in a conventional manner. The card carrier 4 is adapted to hold an optical card 5 as an information card at a predetermined position on it.

The optical card 5 is, as illustrated in FIG. 1, provided in a central portion thereof with an information area 16 in which information is recorded. The optical card 5 has non-information areas 17 and 17 provided in respective opposite lateral sides thereof and outside the information area 16. No information cannot be recorded in the non-information areas 17 and 17. The information area 16 is usually formed by layering the following layers in the described order: a card substrate made of a polyvinyl chloride or the like polymer; an optical recording layer in which reflection and nonreflection patterns are recorded, using an aluminum vapor deposition layer as the reflection layer; a protection layer made of a polycarbonate or the like polymer, for physically protecting the optical recording layer; and a solidified surface layer for reducing surface reflection.

A front mask 6 is mounted above one end of the base 1 through a supporting bracket (not shown). The front mask 6 has a card insertion passage 7 passing through it. The card insertion passage 7 is provided with a card inlet 8 and a card outlet 9. The optical card 5 is inserted into the card inlet 8, and is discharged from the card outlet 9 onto the card carrier 4. The front mask 6 is provided along the card insertion passage 7 with a through slot 10, in which a feed roller set 11 is incorporated for pinching and imparting forwarding movement to the optical card 5 to thereby pass the optical card 5 onto the card carrier 4. The feed roller set 11 includes a pair of drive rollers 12 and 13 and pinch rollers 14 and 15 which oppositely face respective drive rollers 12 and 13 to pinch the optical card 5. The drive rollers 12 and 13 are driven by a drive motor not shown through an endless belt. When the optical card 5 is inserted into the card insertion passage 7 to a predetermined length, it is fed by the drive rollers 12 and 13 which are driven by the drive motor, so that the optical card 5 passes onto the card carrier 4 through the card outlet 9.

An optical head 18 is supported on a carriage frame not shown above the card carrier 4, and the optical head 18 is moved linearly reciprocally by a linear motor also not shown in a direction perpendicular to the direction of the linear reciprocal movement of the card carrier 4. The optical head 18 is provided with a laser beam source 19, which irradiates the optical card 5 for recording and reproducing of information in the optical card 5. The laser beam source 19 has an objective lens 20 mounted at the distal end thereof, and a laser beam emitted from the laser beam source 19 is focused on the optical recording layer previously mentioned through the objective lens 20. The objective lens 20 is vertically moved by a focusing servo mechanism not shown so that the light beam of the laser beam source 19 is controlled to accurately focus on the optical recording layer.

As clearly illustrated in FIG. 1, the card carrier 4 is provided on one lateral edge thereof with two guide bearings 21 and 22 which slidably mounted around the guide shaft 3a. The card carrier 4 has a C-shaped guide slider 23 mounted to the other lateral edge thereof, and the guide slider 23 slidably clamps the guide shaft 3b. The card carrier 4 is thus slidably supported on the guide shafts 3a and 3b through the guide bearings 21 and 22 and the guide slider 23.

Two stopper bushes 24 and 25 are mounted on the guide shaft 3a over which the guide bearings 21 and 22 slide. The front stop position of the card carrier 4 is a position closest to the card outlet 9 of the front mask 6, and at this front stop position the front end of the guide bearing 21 pushes the stopper bush 24 to the left in FIG. 1, and the front end of the stopper bush 24 is stopped by the bracket 2a. The rear stop position of the card carrier 4 is a position farthest from the card outlet 9, and at the rear stop position the rear end of the guide bearing 22 pushes the stopper bush 25 to the right in FIG. 1, and the rear end of the stopper bush 25 is stopped by the bracket 2b. The card carrier 4 is driven to make linear reciprocal movement between the front stop position and the rear stop position.

The card carrier 4 is provided at the rear end thereof with a pair of card stoppers 26a and 26b which make positioning of the optical card 5 in the insertion direction of the optical card 5.

Figure 5:
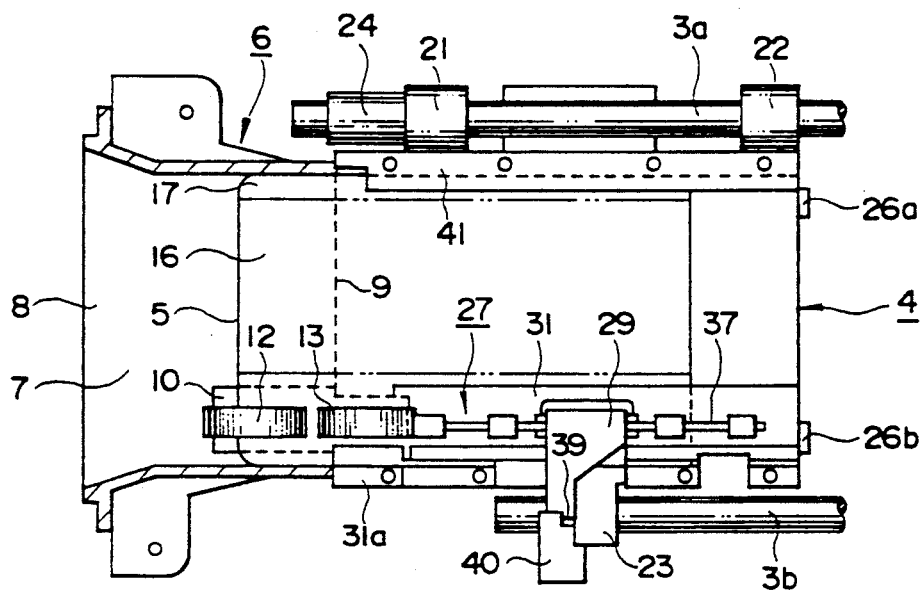
FIG. 5 is an enlarged plan view, partly in section, of the front mask and the card carriage of the information recording and reproducing apparatus of FIG. 1.
Figure 6:
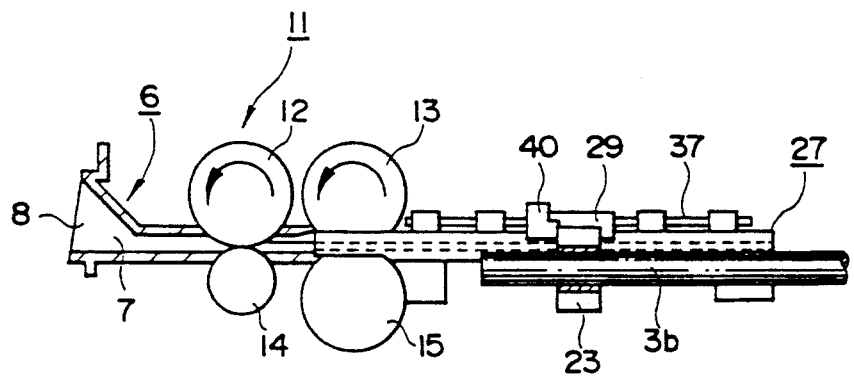
FIG. 6 is a side view, partly in section, of the front mask and the card carriage of FIG. 5.
Figure 7:
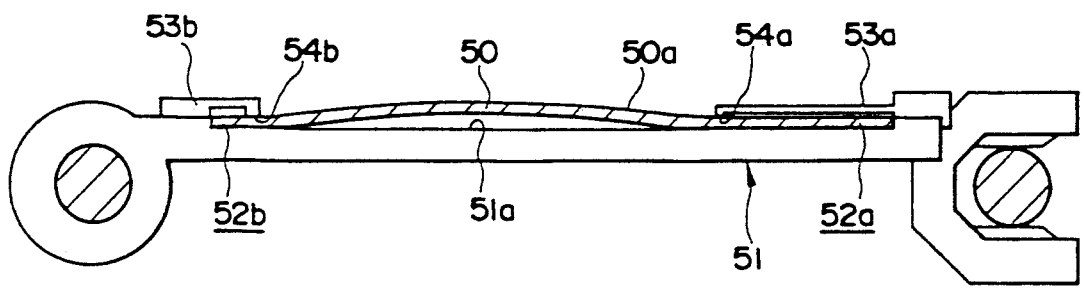
FIG. 7 is a cross-sectional view of the conventional card holding unit.

In FIG. 5, the stopper bush 24 is pushed by the guide bearing 21, and is thus stopped by the bracket 2a not shown, and the card carrier 4 is at the rear stop position. The optical card 5 which has been inserted through the card insertion passage 7 is placed at a position bridging between the card insertion passage 7 and the card carrier 4. An this position, the drive rollers 12 and 13 of the roller set 11 are driven in the directions of the arrows shown in FIG. 6, so that the optical card 5 is moved rearwardly to slide over the card carrier 4 until it is stopped at the rear end thereof by the card stoppers 26a and 26b.

As illustrated in FIG. 1, the card carrier 4 is provided in one lateral side thereof with a card holding unit 27 which securely holds the optical card 5 to the card carrier 4. The card holding unit 27 includes a card holding plate 31 for securely holding the optical card 5 on the card carrier 4, and a card releasing lever 29 which releases the holding state of the optical card 5 by the card holding plate 31.

Between the card holding plate 31 and the upper surface 30 of the card carrier 4 there is longitudinally defined a guiding and holding groove 33 for slidably guiding and securely holding the optical card 5. The card holding plate 31 is, as clearly shown in FIG. 2, supported in a cantilever fashion by attaching the outer edge portion 31a thereof to the card carrier 4. The card holding plate 31 has a flexible portion 31b close to the outer edge portion 31a. The flexible portion 31b of the card holding plate 31 has an arcuate shape convex upwardly and extends longitudinally over the whole length of the card holding plate 31.

On the upper surface 30 of the card carrier 4 right below the flexible portion 31b of the card holding plate 31 there is formed a projection 34 linearly extending longitudinally or in the travel direction of the card carrier 4. On the other hand, the card holding plate 31 is provided at the free edge thereof with a lower projection 35 to face the upper surface 5b of the optical card 5. The lower projection 35 is formed inwardly at a distance of D from the projection 34, and longitudinally extends.

As shown in FIG. 1, a thin supporting shaft 37 passes through the proximal or inner end of the card releasing lever 29, and is supported on blocks 38 mounted on the card holding plate 31. The card releasing lever 29 has a recess 39a formed at the free or outer end 39 thereof. The bracket 2c of the base 1 is provided with a releasing stopper 40 which is engageable with the outer end 39 of the card releasing lever 29.

The card carrier 4 is provided at the other lateral edge portion thereof with a card holding plate 41. A longitudinal groove 43 is defined between the card holding plate 41 and the upper surface 30 of the card carrier 4 for inserting one lateral edge of the optical card 5. The card holding plate 41 has a longitudinal lower projection 42a formed in the inner side of the free lateral edge portion of the card holding plate 41 so that the lower projection 42a may come into contact with the optical card 5.

When the card carrier 4 reaches the front stop position, the outer end 39 of the card releasing lever 29 is brought into engagement with the releasing stopper 40, so that the outer end 39 is depressed by the releasing stopper 40, with the result that an intermediate portion of the card releasing lever 29 presses the flexible portion 31b of the card holding plate 31. This causes the inner end of the card releasing lever 29 to be raised by the lever mechanism using the intermediate portion of the card releasing lever 29 as the furculum. The supporting shaft 37 is thus lifted up, so that the lower projection 35 is raised against the resilient force of the flexible portion 31b to release the depressing state thereof against the optical card 5.

When the card carrier 4 is at a position away from the front stop position, the releasing lever 29 is disengaged from the stopper 40, and the card holding plate 31 depresses the optical card 5 by applying the resilient force of the flexible portion 31b of the card holding plate 31 from the projection 35.

Figure 2:
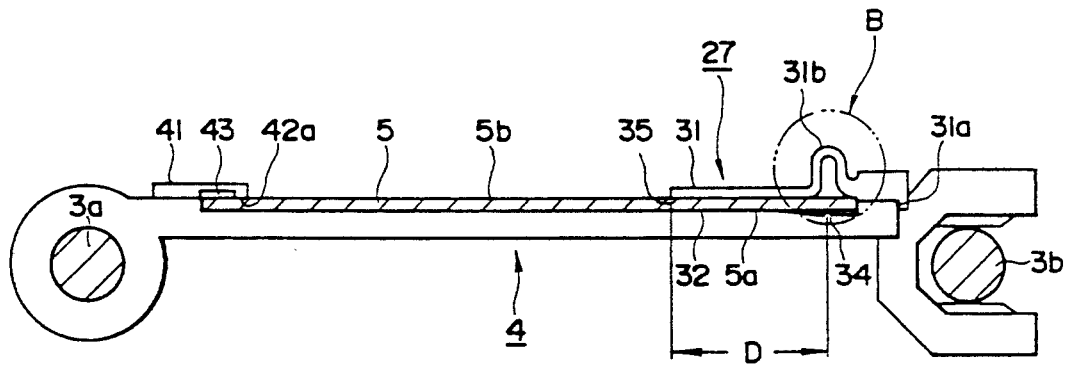
FIG. 2 is an enlarged sectional view taken along the line II—II in FIG. 1, in which the card holding unit of the information recording and reproducing apparatus is in a holding state.
Figure 3:
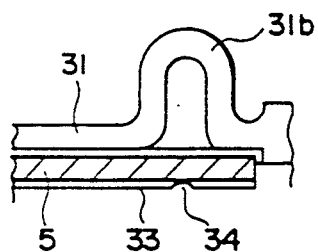
FIG. 3 is an enlarged view of the encircled portion B of FIG. 2.

FIG. 2 illustrates a state in which the card carrier 4 is at a position away from the front stop position, and the optical card 5 is held on the card carrier 4 by the card holding plate 31. The optical card 5 is depressed at the upper surface 5b thereof by the lower projection 35 and the projection 42a whereas the outer edge portion, close to the flexible portion 31b, of the lower surface 5a of the optical card 5 is raised by the projection 34. Even if the optical card 5 is rather bent to be upwardly convex, the optical card 5 is held on the card carrier 4 in the state in which the bend thereof is corrected by cooperation between the projections 34 and 35.

Figure 4:
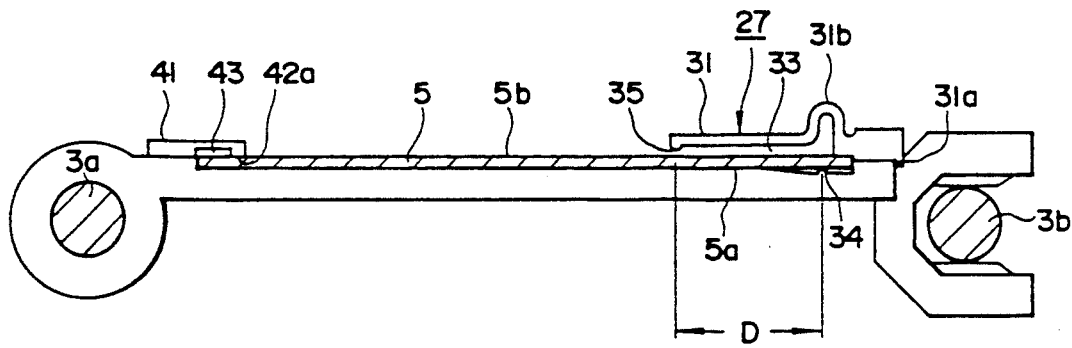
FIG. 4 is an enlarged sectional view taken along the line II—II in FIG. 1, in which the card holding unit of the information recording and reproducing apparatus is in a release state.

In FIG. 4, the card carrier 4 arrives at the front stop position, where the outer end 39 of the card releasing lever 29 is brought into engagement with the releasing stopper 40, and thereby the card holding unit 27 is released by raising the free edge of the card holding plate 31. The optical card 5 is not prevented from sliding over the card carrier 4 even in the presence of the projection 34.

What is claimed is:

1. An information recording and reproducing apparatus of the type which includes a card carrier having an upper surface and opposite lateral edges and adapted for linear reciprocal movement between a front stop position and a rear stop position, a card holder provided to the card carrier for holding an information card on the card carrier, and an optical head reciprocally movable in a direction perpendicular to the movement of the card carrier for recording information in and reproducing information from the information card held on the card carriage, wherein: the card holder comprises first and second card holding means, arranged in respective lateral edges of the card carrier for holding the information card, the first and second card holding means defining respective grooves in cooperation with the upper surface of the card carrier and each including contact means for contacting the information card inserted into the grooves, one of the first and second card holding means including resiliently depressing means for resiliently depressing the contact means thereof against the information card inserted into the grooves; and the card carriage includes raising means, arranged on the upper surface thereof, for raising the information card, the raising means being located away from the contact means of the first and second card holding means so that the information card placed on the card carrier becomes substantially flat in cooperation with the contact means of the first and second card holding means and the raising means for keeping the distance between the information card and the optical head substantially constant.

2. An information recording and reproducing apparatus as recited in claim 1, wherein: each of the contact means comprises a ridge substantially extending along a direction of the linear reciprocal movement of the card carriage; and the raising means comprises another ridge substantially extending along a direction of the linear reciprocal movement of the card carriage.

3. An information recording and reproducing apparatus as recited in claim 2, wherein the resiliently depressing means comprises a resilient arcuate portion integrally formed with the one of the first and second card holding means.

4. An information recording and reproducing apparatus as recited in claim 3, wherein the ridge of the raising means is arranged closer to a corresponding lateral edge of the card carriage than the ridge of the one of the first and second card holding means.

5. An information recording and reproducing apparatus as recited in claim 1, further comprising releasing means for releasing depression of the contact means by the resiliently depressing means.

6. An information recording and reproducing apparatus as recited in claim 5, wherein: each of the contact means comprises a ridge substantially extending along a direction of the linear reciprocal movement of the card carriage; and the raising means comprises another ridge substantially extending along a direction of the linear reciprocal movement of the card carriage.

7. An information recording and reproducing apparatus as recited in claim 6, wherein the resiliently depressing means comprises a resilient arcuate portion integrally formed with the one of the first and second card holding means.

8. An information recording and reproducing apparatus as recited in claim 7, wherein the ridge of the raising means is arranged closer to a corresponding lateral edge of the card carriage than the ridge of the one of the first and second card holding means.

* * * * *